United States Patent [19]

Foyt et al.

[11] Patent Number: 5,375,034
[45] Date of Patent: Dec. 20, 1994

[54] SILICON CAPACITIVE PRESSURE SENSOR HAVING A GLASS DIELECTRIC DEPOSITED USING ION MILLING

[75] Inventors: Arthur G. Foyt, Glastonbury; Paul L. Provenzano, West Hartford; James L. Swindal, Easthampton; Robert A. Wagner, Manchester, all of Conn.

[73] Assignee: United Technologies Corporation, Hartford, Conn.

[21] Appl. No.: 161,335

[22] Filed: Dec. 2, 1993

[51] Int. Cl.[5] .............................................. H01G 7/00
[52] U.S. Cl. ................... 361/283.4; 73/517 R
[58] Field of Search ............... 361/283.1, 283.3, 283.4; 73/715, 718, 724; 29/25.41, 25.42, 621.1; 257/419; 338/4, 42; 128/675, 748; 204/298.04, 298.05; 427/578, 583, 79

[56] References Cited

U.S. PATENT DOCUMENTS

| | | | |
|---|---|---|---|
| 4,405,970 | 9/1983 | Swindal et al. | 361/283.4 |
| 4,415,948 | 11/1983 | Grantham et al. | 29/25.41 |
| 4,467,394 | 8/1984 | Grantham et al. | 361/283.4 |
| 4,513,348 | 4/1985 | Grantham | 29/25.41 |
| 4,517,622 | 5/1985 | Male | 73/718 |
| 4,530,029 | 7/1985 | Beristain | 29/25.42 |
| 4,743,836 | 5/1988 | Grzybowski et al. | 361/280 |
| 4,792,501 | 12/1988 | Allred | 428/699 |
| 4,879,627 | 11/1989 | Grantham | 73/718 |
| 4,883,768 | 11/1989 | Swindal et al. | 437/61 |
| 4,951,174 | 8/1990 | Grantham et al. | 361/283.4 |
| 4,954,925 | 9/1990 | Bullis et al. | 361/283.4 |
| 5,008,774 | 4/1991 | Bullis | 361/283.4 |

Primary Examiner—Bruce A. Reynolds
Assistant Examiner—Michael D. Switzer
Attorney, Agent, or Firm—Richard H. Kosakowski

[57] ABSTRACT

A silicon capacitive pressure sensor is disclosed having a silicon diaphragm and a silicon substrate arranged in parallel and separated by a glass dielectric spacer. The glass is deposited onto a surface of the substrate using an ion milling machine. The sensor further includes a transition piece attached to a second layer of glass insulator disposed between the silicon diaphragm and the transition piece. The transition piece has a throughbore formed therein for applying a fluid to a surface of the silicon diaphragm, the fluid having a pressure desired to be measured by the sensor. The glass disposed between the diaphragm and the transition piece is deposited onto the transition piece using the ion milling process.

14 Claims, 3 Drawing Sheets ized sensor designs unsuitable for demanding aerospace applications, such as electronic engine controls ("EECs") and air data computers ("ADCs").
SILICON CAPACITIVE PRESSURE SENSOR HAVING A GLASS DIELECTRIC DEPOSITED USING ION MILLING

BACKGROUND OF THE INVENTION

This invention relates to silicon capacitive pressure sensors, and more particularly to a silicon capacitive pressure sensor having a glass dielectric deposited using an ion milling technique.

In the art of silicon capacitive pressure sensors, it is known to provide such a sensor as a single sensing element. Prior art single element silicon capacitive pressure sensors typically comprise a pair of parallel conductive silicon plates joined together with an insulative borosilicate glass spacer by a field-assisted, vacuum bonding process. This forms an evacuated chamber within the opposing conductive plates and spacer. The opposing silicon plates comprise the plates of a pressure variable capacitor. See, for example, U.S. Pat. Nos. 4,415,948, 4,405,970 and 4,530,029. Examples of electronic circuitry used to process the sensor output signals indicative of sensed pressure are described and claimed in U.S. Pat. Nos. 4,743,836 and 4,517,622.

In a silicon capacitive pressure sensor, one conductive silicon plate forms a diaphragm that flexes inwardly in the presence of fluid pressure applied to the outside surface of the diaphragm that is greater in magnitude than the pressure (usually vacuum) in the chamber. The second conductive silicon plate forms a substrate that is normally held rigid. The deflection of the diaphragm causes a variation in the distance between the plates, thus varying the capacitance of the plates. Thus, the capacitive pressure sensor is operative to transduce pressure variations into corresponding capacitive variations. The borosilicate glass serves not only to separate the plates, but also to seal the vacuum chamber therebetween. The silicon diaphragm and substrate are normally doped to make them appropriately electrically conductive.

These pressure sensing devices are particularly well suited for miniaturization due to the fine dimensional control achievable using the semiconductor and thin-film technologies. They are also well suited to the measurement of small differential pressures in various commercial and aerospace applications. Microcircuit technology can produce a large number of pressure sensors fabricated from a single silicon wafer.

However, in any silicon capacitive pressure sensor, parasitic capacitance is a limitation on the accuracy of the sensor. This is because such parasitic capacitance may result in an overall long-term drift (20 years) of the sensor output. This is especially true in high accuracy (0.05% or 500 ppm) pressure sensing applications at high temperatures (120° C.). This limiting factor may make some sensor designs unsuitable for demanding aerospace applications, such as electronic engine controls ("EECs") and air data computers ("ADCs").

Parasitic capacitance is the inherent capacitance of the non-pressure sensitive interstices of the sensor structure. For example, the parasitic capacitance of the borosilicate glass spacer may comprise upwards of 50% of the total capacitance of the sensor. Such parasitic capacitance reduces the sensor gain because it adds in parallel to the pressure sensitive capacitance of the sensor. This reduces both the dynamic range of the sensor and its sensitivity to pressure changes. Also, the aging in the electrical properties of the dielectric material disposed between the silicon plates has been identified experimentally as the major contributing factor to the drift of the sensor. Thus, a large effort has been placed in the past on reducing such capacitance through variations in the design of the sensor architecture.

However, parasitic capacitance is inherent in any physical structure and there is a minimum practically achievable value that may still be unacceptable in high sensitivity sensing applications. U.S. Pat. No. 4,405,970 discloses a method of reducing the parasitic capacitance in a silicon capacitive pressure sensor by providing specific borosilicate glass structures that separate fixed portions of the two capacitive plates at a relatively long distance from each other. Another approach to reducing the parasitic capacitance is disclosed U.S. Pat. No. 4,467,394, in which a three-plate device is utilized that, when combined with appropriate signal processing circuitry, eliminates the parasitic capacitance from the measurement. This, in turn, eliminates the resulting overall drift and instability of the sensor. A further approach to eliminating the parasitic capacitance is disclosed in U.S. Pat. No. 4,951,174.

In the fabrication of the prior art silicon capacitive pressure sensors, it is known to deposit the borosilicate glass dielectric spacer onto the silicon substrate using conventional radio frequency ("RF") diode and RF magnetron sputtering techniques. However, such techniques meet with only limited degrees of success. A common problem with these techniques is that the borosilicate glass does not always suitably adhere to the silicon substrate. Because of the critical requirements of the borosilicate glass to have good adhesion to the silicon, low stress, and the required stoichiometry, it is extremely difficult to reach the design objectives of the sensor using these RF techniques.

Accordingly, it is a primary object of the present invention to achieve performance stability of a silicon capacitive pressure sensor by providing a method of applying a glass onto a silicon substrate such that the glass has good adhesion to the silicon, has low stress and the required stoichiometry.

It is a general object of the present invention to utilize a ion milling approach to apply a glass dielectric material onto a silicon substrate or wafer.

It is another object of the present invention to provide a precision, high-performance silicon capacitive pressure sensor having a pair of silicon capacitive plates separated by a glass spacer applied to one of the plates by an ion milling procedure.

The above and other objects and advantages of this invention will become more readily apparent when the following description is read in conjunction with the accompanying drawings.

SUMMARY OF THE INVENTION

To overcome the deficiencies of the prior art and to achieve the objects listed above, the Applicants have invented an improved silicon capacitive pressure sensor having its borosilicate glass dielectric spacer applied to the silicon substrate using an ion milling technique. In the preferred embodiment of the present invention, a silicon capacitive pressure sensor has a pair of parallel plates, each comprised of an appropriately doped silicon, separated by a borosilicate glass dielectric. The plates comprise a substrate and a diaphragm, the diaphragm being comparatively more flexible than the substrate. In the fabrication of the sensor, the glass is deposited onto the silicon substrate using an ion milling technique in which the silicon substrate is strategically positioned within an ion milling machine along with a bulk piece of the borosilicate dielectric glass material. The ion source is then directed at the target bulk glass dielectric material. The ion beam emitted from the ion source strikes the bulk glass dielectric material, which causes particles of glass to be removed therefrom and to be deposited onto a surface of the silicon substrate. The ion milling technique of the present invention includes an initial warm-up procedure, and then the silicon substrate is rotated at a predetermined rotational speed to obtain uniformity of application of the glass onto the substrate. The resulting deposited glass film is considerably greater in thickness (up to 9 microns) than the more conventional "thin film" (less than 1 micron) microelectronic deposition processes. Deposition time can be up to 8 hours or more since operating parameters usually result in a deposition rate of slightly over 1 micron per hour.

BRIEF DESCRIPTION OF THE DRAWINGS

FIG. 7 is a perspective view of an ion source directing its ion radiation at a bulk piece of glass dielectric that, in turn, loses particles that are deposited onto the silicon substrate, in accordance with the ion milling technique of the present invention.

DETAILED DESCRIPTION OF THE PREFERRED EMBODIMENTS

Figure 1:
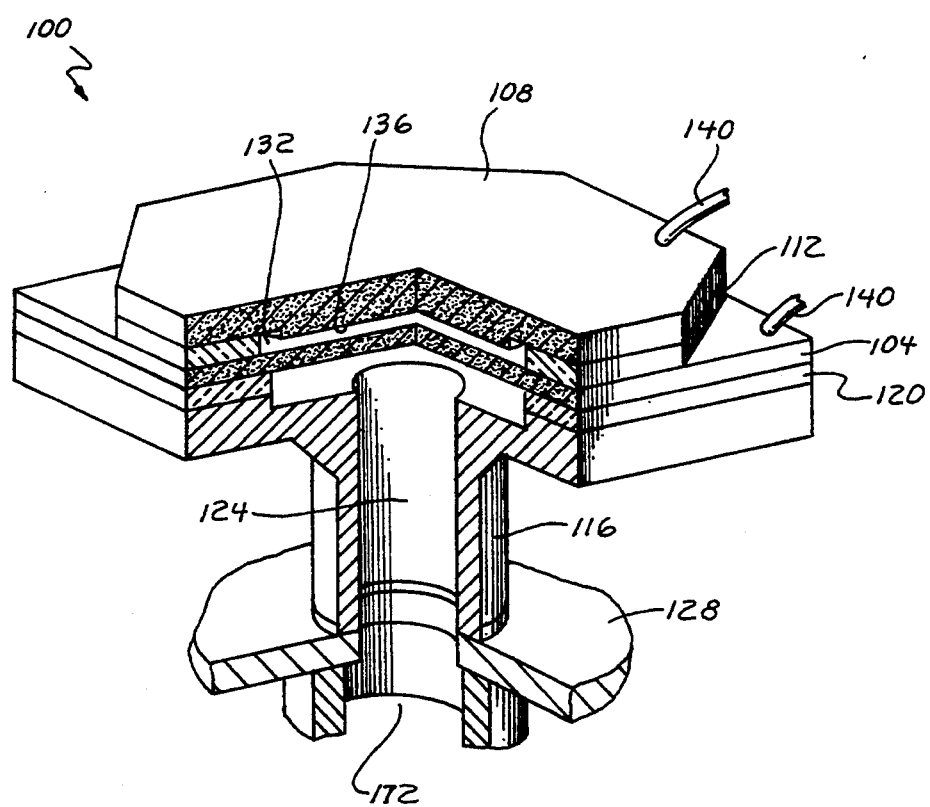
FIG. 1 is a perspective view, partially cut away to reveal a cross-sectional view of a silicon capacitive pressure sensor having a glass dielectric spacer portion thereof deposited onto a silicon substrate by the ion milling technique of the present invention.
Figure 2:
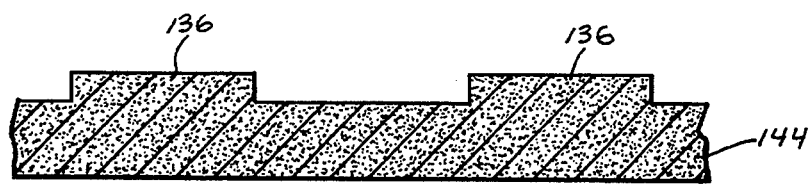
FIGS. 2–6 are cross-sectional views illustrating various steps in the sequential fabrication of the silicon capacitive pressure sensor of FIG. 1.

Referring to the drawings in detail, an exemplary embodiment of a silicon capacitive pressure sensor fabricated according to the ion milling process of the present invention is shown and generally designated by the reference numeral 100. The sensor 100 comprises a pair of parallel silicon capacitive plates (e.g., a diaphragm 104 and a substrate 108) separated by a borosilicate glass dielectric spacer 112. A silicon transition piece 116 is also provided that attaches to the silicon substrate 108 by a second glass dielectric spacer 120. The transition piece 116 has a throughbore 124 formed therein through which the fluid whose pressure is desired to be measured is applied to the diaphragm 104. The transition piece 116 may be mounted on a header 128 and encapsulated in a standard package (not shown), for example, a TO3 package. Electronic signal processing circuitry (not shown) may also be included within the package.

Referring now to FIG. 1, there illustrated is a perspective view, partially cut away to expose in cross-sectional form a silicon capacitive pressure sensor 100. The sensor 100 may be similar in structure to that described in the following U.S. patents, all assigned to the assignee of the present invention, and all hereby incorporated by reference: U.S. Pat. Nos. 4,879,627; 4,883,768; 4,951,174; 4,954,925; 4,513,348; 4,415,948 and 4,405,970. The sensor 100 comprises a silicon diaphragm 104 and a silicon substrate 108, arranged in parallel and separated by a dielectric spacer 112. The spacer 112 is typically made of borosilicate glass that may comprise, for example, the commercially available Model 7070 borosilicate glass supplied by Corning. Thus, the sensor 100 comprises a silicon-glass-silicon ("SGS") sandwich that is typically square in its exterior configuration, but often may be circular or cylindrical in shape for its inner, operative substructure.

The diaphragm 104 comprises a square sheet or plate of appropriately doped silicon, which is somewhat flexible. The substrate 108 also comprises an appropriately doped sheet of silicon. The substrate 108 is typically less flexible than the diaphragm 104. The dielectric spacer 112 disposed between the diaphragm 104 and substrate 108 creates a closed, evacuated, hermetically-sealed chamber 132 between the two parallel silicon plates 104, 108. The chamber 132 is typically held at a zero vacuum value, or, if desired, it can be sealed at a higher reference pressure. The pressure within the chamber 132 depends upon the desired pressure value that the sensor 100 is designed to measure small variations or differential values therearound. The chamber 132 thus provides a reference pressure on one side of the flexible diaphragm 104.

A centrally-located, typically circular mesa 136 is formed on a surface of the substrate 108. The mesa 136 extends into the generally cylindrical chamber 132. The mesa 136 serves as a counter-electrode to the flexible diaphragm 104. A thin insulating glass layer (not shown) may cover the top of the mesa 136.

In the exemplary embodiment of the silicon capacitive pressure sensor 100 of FIG. 1, the spacing between an undersurface of the silicon diaphragm 104 and the top of the mesa 136 is approximately 2.5 microns, while the thickness of the borosilicate glass spacer 112 is typically 9 microns. For an exemplary sensor 100 designed to sense variations in absolute pressure of 50 lbs. per square inch (50 psi), the silicon diaphragm 104 is approximately 8 thousandths (0.008") of an inch thick, while the substrate 108 is approximately 50 thousandths (0.050") of an inch thick.

As the pressure applied to an outside surface of the diaphragm 104 varies, the diaphragm 104 flexes toward the substrate 108. This causes the spacing between the diaphragm 104 and the substrate 108 to change. Since the diaphragm 104 and the substrate 108 serve as the plates of a parallel plate capacitor, the flexing of the diaphragm 104 inwardly increases the capacitance of the sensor 100. The change in capacitance as a result of the change in the pressure applied to the surface of the diaphragm 104 is used as a measure of the pressure applied to the sensor 100.

A pair of electrical conductors or wires 140 are connected to the diaphragm 104 and substrate 108 for connection to a well-known signal processing circuit (not shown), located external to the sensor 100. The circuit may be located within the package (not shown) for the sensor 100. The circuit typically measures the changing capacitance of the sensor 100 as a function of the applied pressure on the diaphragm 104. The varying pressure on the exterior, sensing surface of the flexible silicon diaphragm 104 causes the diaphragm 104 to flex. Such flexing changes the value of the intersticial capacitance between the diaphragm 104 and the substrate 108, which transduces the applied pressure into a measurable electronic signal. As noted hereinabove, there is an approximately 2.5 micron spacing between the undersurface of the diaphragm 104 and the top of the mesa 136 when the sensor 100 is at its zero or otherwise reference pressure. Such spacing allows room for the diaphragm 104 to flex toward the mesa 136 as the pressure applied on the exterior surface of the diaphragm 104 is increased.

The wall of the borosilicate glass spacer 112 typically has a horizontal thickness of, e.g., 36 thousandths (0.036″) of an inch. The mesa 136 extends up from the silicon substrate 108 to a dimension of approximately 6.5 microns. The diameter of the mesa 136 may be 150 thousandths (0.150″) of an inch.

As illustrated in FIG. 1, the silicon diaphragm 104 may typically be square, while the silicon substrate 108 may have an octagonal shape. The octagonal shape of the substrate 108 provides access for attachment of the electrical wires 140 to the silicon diaphragm 104. In the exemplary embodiment of FIG. 1, the silicon substrate 108 has a side length of 260 thousandths (0.260″) of an inch, while the wall of the borosilicate glass spacer 112 has an inner diameter of 190 thousandths (0.190″) of an inch. The outer side surface of the wall spacer 112 can either follow the basic square configuration of the silicon diaphragm 104, or it may have a circular configuration.

A transition piece 116, comprised of appropriately doped silicon, is bonded to a borosilicate glass spacer 120 that, in turn, is bonded to the exterior surface of the silicon diaphragm 104. The glass spacer 120 may also comprise the Model 7070 glass provided by Corning. The transition piece 116 includes a pressure port 124, which comprises a throughbore, through which the fluid whose pressure is to be sensed is communicated to the exterior surface of the diaphragm 104. The transition piece 116 tapers down to its pedestal shape for mounting to the surface of the header 128. The pedestal shape accommodates the temperature coefficient mismatch between the silicon and header material. Typically, the transition piece 116 has a thickness of approximately 125 thousandths (0.125″) of an inch.

Referring now to FIGS. 2–6, there illustrated in cross-sectional form is the sequence of steps in fabricating the sensor 100 of FIG. 1. The starting point in the fabrication process is a commercially-available silicon wafer 144 (FIG. 2) that comprises the substrate 108 of a fabricated sensor 100. To make the wafer 144 suitably electrically conductive, the wafer 144 is appropriately doped with, for example, antimony. However, the substrate wafer 144 may either be doped with either N or P type impurities having a doping concentration of at least $10^{15}$ impurity per cubic centimeter to achieve less than 1 ohm-centimeter resistivity.

Using well-known masking, photoresist and etching techniques, the substrate wafer 144 is etched away at predetermined locations to create a plurality of mesas 136, each mesa 136 being approximately 6.5 microns in height.

Figure 3:
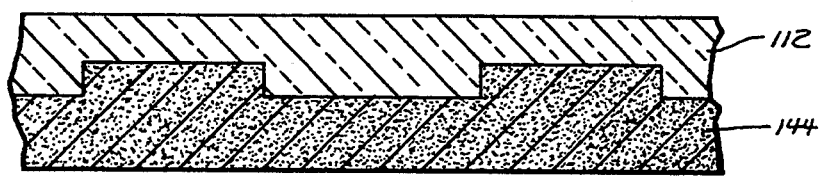
Figure 4:
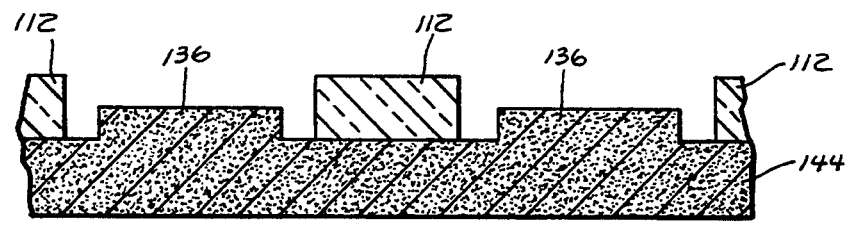

Next, referring to FIG. 3, the borosilicate glass 112 that serves as the dielectric spacer 112 is deposited onto the silicon substrate wafer 144 using the ion milling technique of the present invention, illustrated in greater detail in FIG. 7. In FIG. 7 is illustrated an ion source 148 that is part of a commercially-available ion milling machine; for example, the Model MPS5001 ion milling machine provided by Ion Tech Inc., of Colorado Springs, Colo. The ion source 148 directs its ion radiation toward a bulk piece of glass 152 that comprises, e.g., the Model 7070 borosilicate glass provided by Corning. As the ions from the ion source 148 strike the bulk borosilicate glass material 152, pieces of the glass are dislodged therefrom and are directed toward the silicon substrate wafer 144 of FIG. 2 where they are deposited onto a surface thereof. The ion source 148, bulk borosilicate glass material 152 and silicon substrate wafer 144 are disposed within a vacuum chamber 156 of the ion milling machine.

Due to design considerations of the sensor 100, the borosilicate glass 112 is deposited onto the surface of the silicon substrate wafer 144 to a thickness of approximately 9 microns. The ion milling process of the present invention typically deposits borosilicate glass at the rate of approximately 1 micron per hour. Thus, the glass deposition time may be up to 8 hours or more.

Prior to depositing the borosilicate glass 112 onto the silicon substrate wafer 144, a five-step warm-up procedure for the ion milling machine is utilized. Initially, the vacuum chamber 156 is evacuated to a pressure of $10^{-6}$ Torr. Next, the gun (not shown) within the ion source 148 is "warmed up" by applying 0.15 amperes of anode or "arc" current. Then, all other ion beam currents and voltages are set at approximately ½ of normal operating power. Next, magnet current is slowly increased while other beam currents and voltages are turned up to full power. Finally, the ion source 148 is run at full power for approximately 20 minutes to "sputter" clean the target. Following this warm-up procedure, the silicon substrate wafer 144 is placed into its strategic position within the vacuum chamber 156 of the ion milling machine and the substrate wafer 144 is rotated at approximately 3.3 rpms to obtain uniform distribution of the glass particles on the surface of the wafer 144.

The glass deposited in accordance with the ion milling process of the present invention serves three purposes: as a dielectric spacer 112 forming an enclosed vacuum chamber 132 between the conductive substrate 108 and conductive diaphragm 104; as a means of forming a precise gap between the diaphragm 104 and substrate 108; and as an agent for bonding the silicon substrate 108 and diaphragm 104 to the spacer 112. FIG. 3 illustrates the silicon substrate wafer 144 having the borosilicate glass layer 112 deposited thereon to a thickness of approximately 9 microns in accordance with the ion milling procedure illustrated in FIG. 7.

The type of glass used as the dielectric spacer 112 is important. As mentioned hereinbefore, the glass comprises the Model 7070 borosilicate glass provided by Corning. This glass has the same thermal properties (e.g., thermal expansion coefficients) as the silicon substrate wafer 144. Also, this glass has lithium and potassium ions that are available to assist in the bonding of the diaphragm 104 to the glass spacer 112, as described in greater detail hereinafter.

The next step in the process is that the silicon substrate wafer 144 with the glass spacer 112 formed thereon may be subject to thermal processing, such as annealing, to reduce any stresses in the glass. The borosilicate glass layer 112 is then appropriately etched or patterned (see FIG. 4) using well-known photolithographic and etching techniques. This forms the glass spacer 112 only around the approximately perimeter of that portion of the silicon substrate wafer 144 that comprises the substrate 108 of the fabricated sensor 100.

Figure 5:
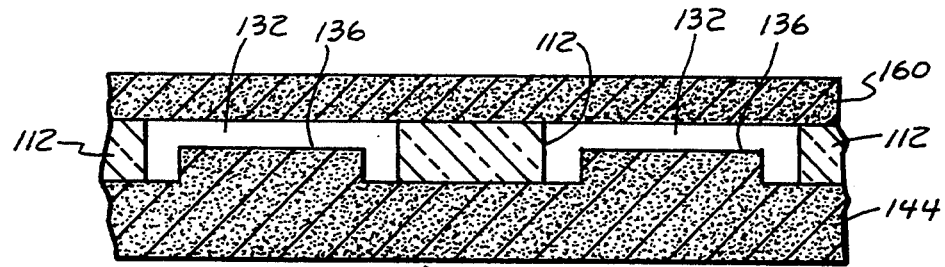
Figure 6:
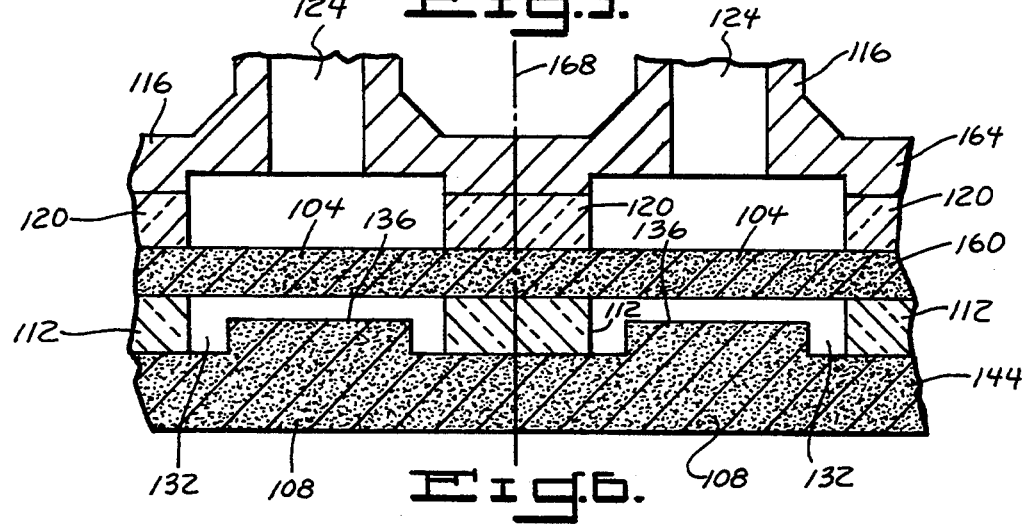
Figure 2:
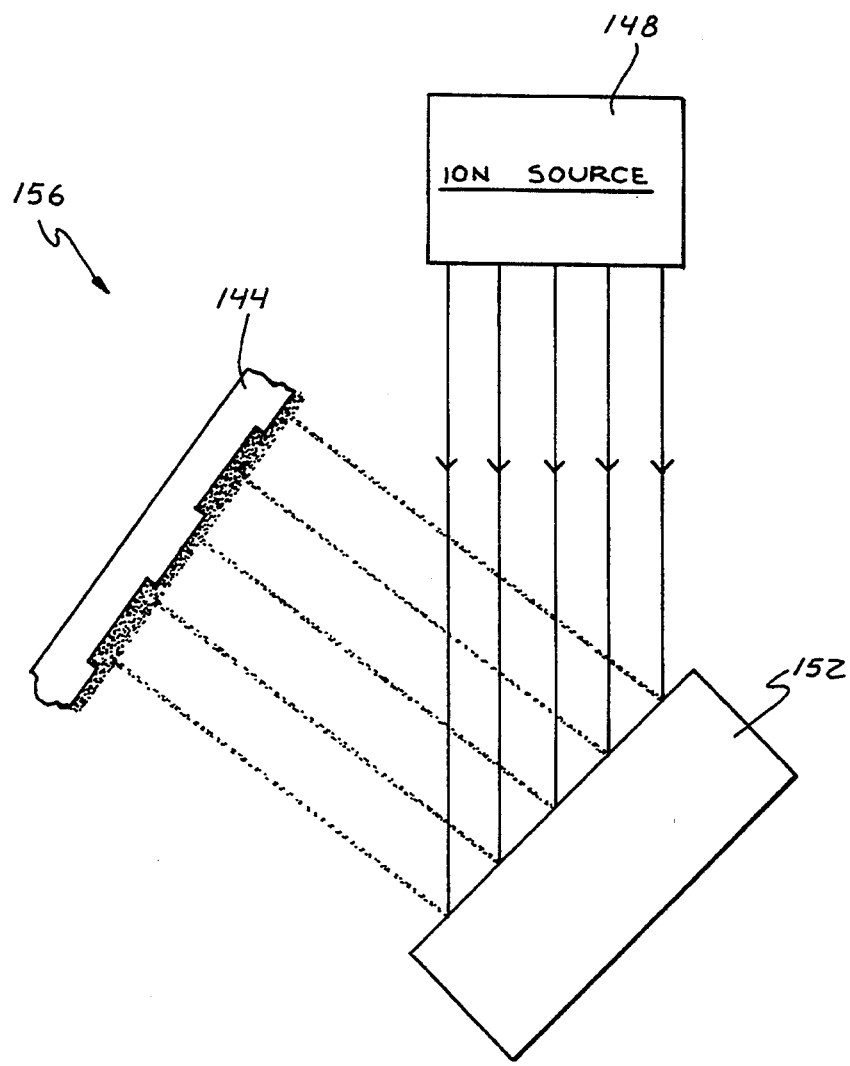

After the substrate wafer 144 has been prepared as described hereinbefore, a second silicon wafer 160 may be prepared, by suitable lapping to a desired thickness, such as on the order of 200 microns, to form the flexible diaphragm 104 (see FIG. 5). In a similar manner to the silicon substrate wafer 144, the silicon diaphragm wafer 160 may be appropriately doped with the desired impurities. The silicon diaphragm wafer 160 is then bonded to the dielectric glass spacer 112 using known electrostatic bonding techniques. For example, the diaphragm wafer 160 may be bonded using the known field assisted sealing technique of joining glass to semiconductors. This technique involves subjecting the diaphragm wafer 160 to temperatures of approximately 300°–500° C. to induce ionic mobility within the borosilicate glass. The aforementioned Model 7070 glass from Corning has lithium and potassium ions available at high temperature that may be used in this electrostatic bonding technique. After being heated to a high degree of conductivity, the glass spacer and diaphragm junction is then subjected to an electric potential on the order of 100 volts DC. This produces a depletion layer at the interface between the silicon and the glass. If the electric potential is properly directed, the positive lithium and potassium ions drift away from the interface and a high field is created across this interface. This causes intimate contact between the glass spacer 112 and the silicon diaphragm wafer 160. In this manner, a hermetic seal between the silicon and glass is formed. This above-described process is normally accomplished in a vacuum in order to provide an absolute pressure sensor.

Both the silicon substrate wafer 144 and silicon diaphragm wafer 160 may have thin metallization layers deposited locally thereon, for example, in the form of a 500 angstrom thick layer of nickel, followed by a second layer of about 5000 angstroms of gold. This provides a suitable surface for wire bonding of the electrical wires 140 to both the diaphragm 104 and the substrate 108.

Next, another wafer 164 of appropriately doped silicon is provided. This silicon wafer comprises the transition piece 116 of a fabricated sensor 100. More particularly, the wafer 164 has the desired transition pieces 116 formed at appropriate locations in the wafer by forming the pedestal-shaped outer surface and the throughbores 124 therein. The pedestal shapes and throughbores 124 may be etched in the transition piece silicon wafer 164 using known techniques. The transition piece wafer 164 may be on the order of 125 thousandths (0.125") of an inch thick. The transition piece wafer 164 then has a layer 120 of dielectric glass deposited thereon in accordance with the ion milling technique of the present invention. The glass deposited onto the silicon wafer 164 may also comprise the Model 7070 borosilicate glass from Corning. The glass layer 120 may be deposited in an identical manner (FIG. 7) as the glass spacer 112 deposited onto the silicon substrate 108. The second glass layer 120 is photolithographically patterned and etched into a ring only around the perimeter of the resulting transition piece 116. The glass layer 120 is then bonded to the silicon diaphragm wafer 160 using electrostatic bonding techniques. The glass layer 120 contacts the diaphragm wafer 160, as illustrated in FIG. 8.

Once the aforementioned steps illustrated in FIGS. 2–7 have taken place, the resulting silicon and glass multi-layered component is diced appropriately, such as by sawing, to provide a plurality of individual piece parts, as indicated by the dashed lines 168. Also, the silicon substrate 108 may, if desired, be cut into an octagon shape to expose the electrical connection points on the silicon diaphragm 104.

The individual piece part silicon capacitive pressure sensor 100, fabricated in accordance with the ion milling procedure of the present invention, may then be mounted to a surface of the header 128 (FIG. 1). The header may comprise a material sold under the trademark KOVAR®, or other similar alloys. The header has a throughbore 172 that acts as a pressure port through which the fluid whose pressure is desired to be measured by the sensor 100 is applied thereto. The throughbore 124 of the transition piece 116 is aligned over the pressure port 172 such that the transition piece 116 is in contact with the surface of the header 128. The transition piece 116 is then bonded to the header 128 using an eutectic bonding process. This process involves coating with gold the outer surface of the silicon transition piece 116 that is to contact the header 128. Then, the sensor 100 and the header 128 are heated at an elevated temperature to bond the sensor 100 to the header 128.

It should be understood by those skilled in the art that structural modifications can be made without departing from the spirit of the invention. Accordingly, reference should be made primarily to the accompanying claims, rather than the foregoing specification, to determine the scope of the invention.

Having thus described the invention, what is claimed is:

1. A silicon capacitive pressure sensor, comprising:
   a. a silicon substrate;
   b. a silicon diaphragm having a sensing surface operable to sense a pressure of a fluid applied thereto; and
   c. a first layer of glass disposed between the silicon substrate and silicon diaphragm around the periphery thereof such that an enclosed chamber is formed bounded by the silicon substrate, the silicon diaphragm and the first layer of glass, wherein the first layer of glass is deposited to a thickness of at least nine microns onto a surface of the silicon substrate by a method comprising the steps of:
      i. placing the silicon substrate within a vacuum portion of an ion milling machine;
      ii. placing a glass material within the vacuum portion of the ion milling machine; and
      iii. causing ions to be emitted from an ion source towards the glass material, wherein when the ions strike the glass material, particles of the glass are removed therefrom and are deposited onto the surface of the silicon substrate in adherence thereto, thereby forming the first layer of glass.

2. The silicon capacitive pressure sensor of claim 1, wherein the silicon diaphragm is in parallel with the silicon substrate.

3. The silicon capacitive pressure sensor of claim 1, further comprising:
   d. a silicon transition piece; and
   e. a second layer of glass disposed between the silicon diaphragm and the silicon transition piece, wherein the second layer of glass is deposited onto a surface of the silicon transition piece by a method comprising the steps of:
      i. placing the silicon transition piece within a vacuum portion of the ion milling machine;
      ii. placing glass material within the vacuum portion of the ion milling machine; and
      iii. causing ions to be emitted from an ion source toward the glass material, wherein the ions strike the glass material, particles of the glass are removed from the glass material and are deposited onto the surface of the silicon transition piece in adherence thereto, thereby forming the second layer of glass.

4. The silicon capacitive pressure sensor of claim 1, wherein the first layer of glass comprises a borosilicate glass.

5. The silicon capacitate pressure sensor of claim 3, wherein the second layer of glass comprises a borosilicate glass.

6. A method of fabricating a silicon capacitative pressure sensor, comprising the steps of:
   a. placing a silicon substrate within a vacuum portion of an ion milling machine;
   b. placing glass material within the vacuum portion of the ion milling machine; and
   c. causing ions to be emitted from an ion source towards the glass material, wherein when the ions strike the glass material particles of glass are removed therefrom and are deposited onto the surface of the silicon substrate in adherence thereto, thereby forming a first layer of glass to a thickness of at least nine microns.

7. The method of claim 6, further comprising the steps of:
   d. placing a silicon transition piece within the vacuum portion of the ion milling machine;
   e. placing glass material within the vacuum portion of the ion milling machine; and
   f. causing ions to be emitted from the ion source towards the glass material, wherein when the ions strike the glass material particles of the glass are removed therefrom and are deposited onto the surface of the silicon transition piece in adherence thereto, thereby forming a second layer of glass.

8. The method of claim 6, further comprising the step of bonding a silicon diaphragm to the first layer of glass.

9. The method of claim 7, further comprising the steps of:
   bonding a silicon diaphragm to the first layer of glass; and
   bonding the second layer of glass, deposited onto the silicon transition piece, to the silicon diaphragm.

10. The method of claim 8, wherein the step of bonding comprises a field-assisted, vacuum bonding step.

11. The method of claim 9, wherein each step of bonding comprises a field assisted, vacuum bonding step.

12. The method of claim 6, wherein the first layer of glass comprises a borosilicate glass.

13. The method of claim 7, wherein the second layer of glass comprises a borosilicate glass.

14. A method of fabricating a silicon capacitive pressure sensor having a silicon diaphragm that is operable to flex in the presence of a pressure of a fluid applied thereto, and including a silicon substrate disposed in parallel to the silicon diaphragm and separated therefrom by a first layer of a glass, the sensor further including a silicon transition piece separated from the silicon diaphragm by a second layer of glass, the method comprising the steps of:
   a. placing the silicon substrate within a vacuum portion of an ion milling machine;
   b. placing glass material within the vacuum portion of the ion milling machine;
   c. causing ions to be emitted from an ion source towards the glass material, wherein when the ions strike the glass material, particles of the glass are removed therefrom and are deposited onto a surface of the silicon substrate, such deposited glass particles comprising the first layer of glass disposed between the silicon substrate and the silicon diaphragm of the sensor and being of a thickness of at least nine microns;
   d. placing the silicon transition piece within the vacuum portion of the ion milling machine;
   e. placing glass material within the vacuum portion of the ion milling machine; and
   f. causing ions to be emitted from an ion source towards the glass material, wherein when the ions strike the glass material, particles of the glass are removed therefrom and are deposited onto a surface of the silicon transition piece, such glass particles comprising the second layer of glass disposed between the silicon transition piece and the diaphragm.

* * * * *